United States Patent [19]

Masclet et al.

[11] 4,323,001
[45] Apr. 6, 1982

[54] OPERATING AND BRACING JACK HAVING AN INTERNAL LOCKING MECHANISM

[75] Inventors: Jean Masclet, Paris; Jacques Veaux, Chatillon, both of France

[73] Assignee: Messier-Hispano-Bugatti, Montrouge, France

[21] Appl. No.: 935,575

[22] Filed: Aug. 21, 1978

[30] Foreign Application Priority Data

Sep. 8, 1977 [FR] France .................................. 77 27240
Oct. 20, 1977 [FR] France .................................. 77 31564

[51] Int. Cl.³ .............................................. F15B 15/22
[52] U.S. Cl. .......................................... 91/25; 91/405; 92/21 MR; 92/26; 92/27
[58] Field of Search ................... 92/21 R, 21 MR, 23, 92/24, 26, 27, 28, 30, 29; 91/25, 405

[56] References Cited

U.S. PATENT DOCUMENTS

| Re. 27,294 | 2/1972 | Fredd | 92/26 |
| 2,349,244 | 5/1944 | Brown | 92/21 MR |
| 3,315,568 | 4/1967 | Fredd | 92/27 |
| 4,024,800 | 5/1977 | Masclet | 92/26 |

FOREIGN PATENT DOCUMENTS 2164578 7/1973 Fed. Rep. of Germany .......... 92/26

Primary Examiner—Abraham Hershkovitz
Attorney, Agent, or Firm—McAulay, Fields, Fisher, Goldstein & Nissen

[57] ABSTRACT

A bracing jack comprising a cylinder and a jack bar slidable in the cylinder from a bar extended position to a bar retracted position, the jack having an internal locking mechanism including a hydraulic and a mechanical actuator for unlocking under load.

12 Claims, 4 Drawing Figures

OPERATING AND BRACING JACK HAVING AN INTERNAL LOCKING MECHANISM

The present invention relates to an operating and bracing jack having an internal locking mechanism and, more particularly, to a jack of this kind having hydraulic and mechanical actuation for unlocking under load.

Jacks of this nature are already known for the operation and bracing of parts of aircraft landing gear assemblies, for example the doors of undercarriage housing recesses. These known jacks have the disadvantage that, in case of a hydraulic failure when the jack is in the locked position, hydraulic forces within the jack may be assisted by the external forces on the door to act against the opening of the door by means of an emergency device to such an extent that the device cannot overcome the combined forces.

A principal object of the present invention is to provide a jack equipped with an internal locking mechanism which is arranged to be unlocked under load by means of a mechanical device performing a small amount of actuating work.

The principle applied in the invention consists in making use of a locking device comprising two stages, the first of which is a principal lock substantially bearing the load (approximately 90% thereof) which exerts a driving force in the releasing direction of this principal lock, the driving force being borne for its part by a secondary lock which forms the second stage and which carries no more than a small proportion (approximately 10%) of the stress borne by the principal lock, so that the freeing force of the secondary lock is very small as compared to that of a conventional lock in a known jack of this nature.

In accordance with the present invention there is provided an operating and bracing jack provided with an internal device which is arranged to lock a jack bar within a jack cylinder and which comprises a hydraulic and mechanical actuator for release under load, the device comprising principal locking means arranged to bear the major proportion of the locking stresses and formed by a plurality of principal resilient longitudinal catches which are secured to the base of the cylinder and are arranged to engage behind a principal step provided on the bar and be locked in this position by a principal locking piston, the free extremities of the principal catches forming a sloping face which cooperates with a bearing surface of corresponding shape on the principal locking piston, and secondary locking means which are arranged to lock the principal locking piston by a short operating stroke and which are arranged to be released either hydraulically under the action of an operating thrust of the bar within the cylinder, or mechanically by means of a mechanically displaceable backing bar, the freeing of the secondary locking means involving a short operating stroke which results in the release of the principal locking means, this release being assisted by the effect of the load of the jack on the sloping face of the principal catches.

In one embodiment of the invention, said secondary locking means comprises a plurality of secondary longitudinal resilient catches which are arranged to engage behind a secondary step effectively integral with the cylinder and which are arranged to be locked in this position by a secondary locking piston slidably mounted in a sealed manner on the bar and spring-urged towards the secondary catches carried by the principal locking piston which is spring-urged towards the principal catches, the secondary locking piston being arranged to be moved to the release position of the secondary catches either hydraulically under the action of a thrust which moves the bar, or mechanically by means of a stop provided on the backing bar, the secondary locking piston being arranged to engage and move the principal locking piston into the release position of the principal catches, this movement being assisted by the load of the jack on the sloping face of the principal catches.

In a preferred embodiment of the invention, additional advantages are realised. These additional advantages are, primarily:

(a) in rendering the action of the springs on the principal locking piston independent of the action of the springs on the secondary locking piston, and conversely;

(b) in screening the principal locking piston and the secondary locking piston against the action of counterthrusts in such a manner as to prevent overloading of the catches, in particular the resilient secondary catches at the moment of locking; and also, (c) in exerting an action in the same direction and from the front, on the two sets of catches (principal and secondary) by means of their own locking piston.

In the preferred embodiment, the secondary locking means comprise a plurality of secondary longitudinal resilient catches arranged to engage behind a secondary step and to be locked in this position by a secondary locking piston spring-urged towards the secondary catches, the principal locking piston being spring-urged towards the principal catches and the principal and secondary locking pistons both being slidably mounted on a hydraulic release piston and arranged to be moved by the release piston to the release position of the principal catches and secondary catches, respectively, the hydraulic release piston being slidably mounted in a sealed manner on the bar and cooperating with the backing bar by means of stops, so that the release piston may be displaced either hydraulically under the action of an operating thrust on the bar, or mechanically by entrainment of the backing bar which moves the principal and secondary locking pistons in the released position.

Embodiments of the invention will now be described with reference to the accompanying drawings, in which:

FIG. 4 shows a preferred form which embodies virtually all the advantages listed above.

Figure 1:
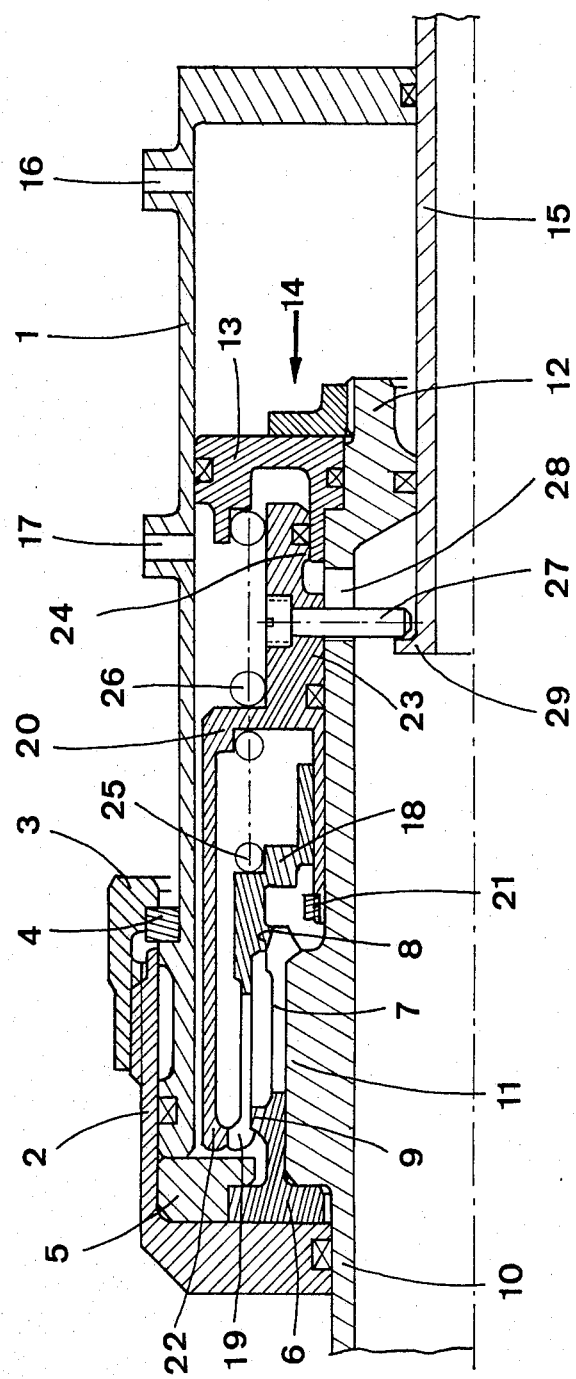
FIGS. 1 to 4 are axial semi-cross-sectional elevations showing four different forms of jack in accordance with the invention, each jack being locked in the "bar extended" position.

Referring to FIG. 1 of the drawings, the jack comprises a cylinder 1 having a cylinder base 2 attached by means of a closure element 3 and a wedged ring 4. A wedged ring 5 also holds base member 6 of a set of principal longitudinal resilient catches 7 against the base 2. The catches have sloping rear faces 8 at their free ends to impart a tapering shape to the extremity of the set of catches 7. A step 9 is also located at the base of the set of catches 7.

A jack bar 10 slidably mounted in a sealed manner in the cylinder 1, is formed with a step 11 referred to as a principal step, behind which are engaged the principal catches 7 in the "bar extended" position. A piston element 13 is mounted on end 12 of the bar 10, to slide within the cylinder 1. The piston element 13 is slidably mounted in sealed manner in the cylinder 1 and to the bar end 12 which is sealed in relation to a backing bar 15, and thus forms an operating piston 14 of the bar 10 in the cylinder 1. The bar 10 can be moved to the "bar extended" position and the "bar retracted" position by means of hydraulic fluid fed through orifices 16 and 17, respectively, in the wall of cylinder 1.

The sloping faces 8 of the catches 7 co-operate with a sloping bearing surface of corresponding shape formed on a principal locking piston 18 which carries a set of secondary resilient longitudinal catches 19 arranged to engage behind the step 9 which will be referred to as the secondary step. The piston 18 is slidably mounted on part of a secondary locking piston 20, and is movable between two stops one of which is the body of the piston 20 and the other of which is a stop 21. Furthermore, the locking piston 20 has a tip 22 which acts to lock the secondary catches 19 behind the secondary step 9. The piston 20 is slidably mounted on the bar 10 through two sections 23 and 24 of different internal diameters which are in sealed contact with the bar 10 itself and with a part of the piston element 13, respectively. The smaller diameter section 23 of the locking piston 20 has a part which extends towards the principal catches 7. The principal locking piston 18 is urged towards the catches 7 by a first spring 25 bearing also against the secondary locking piston 20 which is itself urged towards the secondary catches 19 by means of a second spring 26 bearing also against the piston element 13 on the bar 10.

The secondary locking piston 20 carries a bolt 27 which passes radially through a longitudinal slot 28 in the bar 10. The end of the bolt 27 is arranged to engage an entrainment stop 29 formed at the end of the backing bar 15 which is mechanically displaceable by, for example, a rack and a pinion drive.

When the jack is locked in the "bar extended" position, as illustrated, any external load which tends to re-insert the bar 10 into the cylinder 1, and which may be assisted by internal hydraulic loading, produces a force tending to unlock the catches 7. This force also exerts a driving force on the principal locking piston 18, in the area of the principal lock formed by the catches 7, the step 11 and the principal locking piston 18. This driving force is borne by the secondary lock which is formed by the catches 19, the step 9 and the tip 22 of the secondary locking piston 20, which bears no more than a small portion of the stress borne by the principal lock.

To unlock this device hydraulically, it is sufficient to feed hydraulic fluid through the orifice 17 and exert differential pressures on the sections 23 and 24 of the secondary locking piston 20. The piston 20 is thus displaced (to the right in the drawings) towards the operating piston 14, against the action of the spring 26, and the tip 22 no longer locks the catches 19. On release of the catches 19, the principal locking piston 18 is then moved, against the action of the spring 25, into the unlocked position of the principal catches 7, with the aid of the load of the jack tending to reinsert the bar, thanks to the sloping face 8 of the rear of the catches 7, which behave like self-releasing catches. The bar 10 may thereupon re-enter the cylinder 1.

To unlock the device mechanically, the jack being loaded as previously, it is sufficient to displace the backing bar 15, the stop 29 on which holds the bolt 27 and consequently the secondary locking piston 20 against the action of the spring 26; this action frees the catches 19. Due to the sloping face 8 of the catches 7, and as already explained, the load on the jack plays a part in releasing the catches 7 and frees the bar 10.

In the case of no load or a small load on the jack, the bolt 27 is displaced by the stop 29 within the opening 28 through a first stage corresponding to the freeing of the catches 19, and then through a second stage during which the stop 21 on the secondary locking piston 20 engages and moves the principal locking piston 18 to release the catches 7. The length of the opening 28 should consequently be appreciably greater than the stroke of the secondary locking piston 20.

To pass from the "bar retracted" position to the "bar extended" position, it is sufficient to introduce hydraulic fluid through the orifice 16 to displace the operating piston 14 (to the left in the drawing), and the locking action proceeding automatically. At the beginning of this locking action, the free ends of the catches 7, resting on the step 11, stop the internal displacement of the principal locking piston 18 the catches 19 of which have their free ends resting on the step 9. Thus, the internal displacement of the secondary locking piston 20 is stopped, and the two springs 25 and 26 are loaded.

When the bar 10 reaches and is stopped in its extended position, the ends of catches 7 engage behind the step 11, and the two locking pistons 18 and 20 are moved by the springs 25 and 26. This causes the sloping bearing surface of the principal locking piston 18 to lock the catches 7 and, at the same time, the catches 19 engage behind the step 9 and the secondary locking piston 20 then locks the catches 19 by means of its tip 22.

Figure 2:
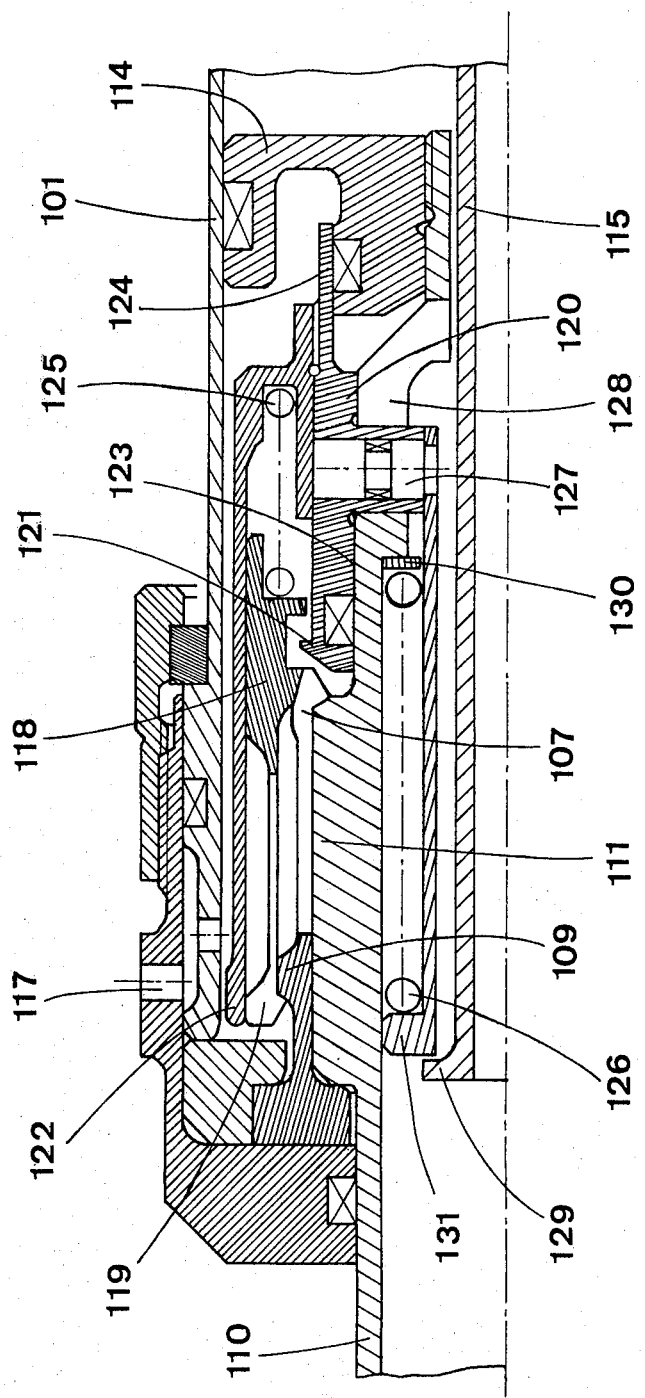

In the construction illustrated in FIG. 1, the second spring 26 is arranged outwardly of the bar 10, and in series with the first spring 25. An alternative series arrangement of the springs is to have the second spring 26 within the bar 10, as illustrated in FIG. 2. This alternative construction is analogous in structures and operation to that of the embodiment of the invention described with reference to FIG. 1, and corresponding components are denoted by the same reference numerals increased by 100 and are not described again in detail.

In FIG. 2 it will be noted that the second spring 126, located inside the bar 100, bears at one end against an internal stop 130 near the end of the bar 110 and, at the other end, bears against an end stop 131 formed on a member secured by the bolt 127. The stop 131 is also arranged to engage the stop 129 on the backing bar 115.

Figure 3:
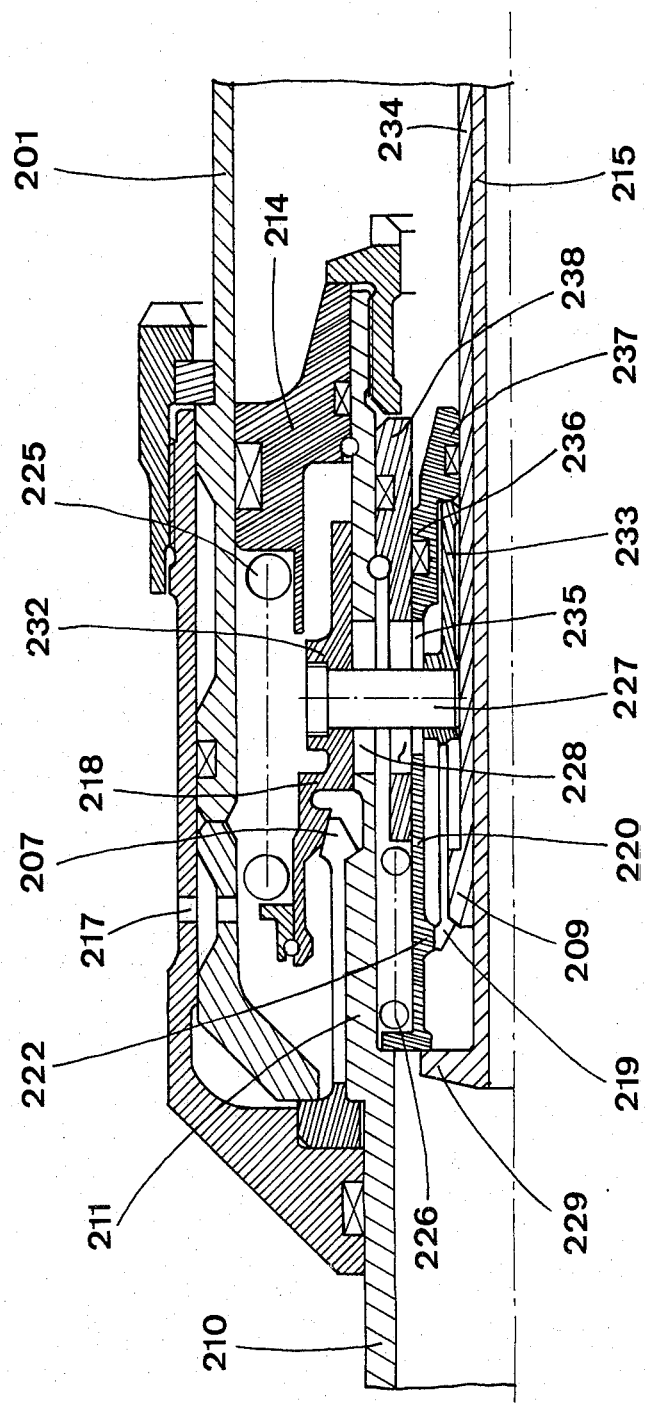

To provide a more compact construction, the two springs may be arranged in parallel, as in the third embodiment of the invention illustrated in FIG. 3. This construction has an operation analogous to those illustrated in FIGS. 1 and 2 and parts corresponding to those in the similar construction of FIG. 1 are denoted by the same reference number increased by 200 and will not be described again in detail.

In this third embodiment, the principal locking piston 218 is in the form of a block 232 slidable on the external surface of the jack bar 210 and is urged toward the principal catches 207 by means of the first spring 225 bearing also on the piston 214 which is secured to the end of the bar 210 within the cylinder 201. The block 232 is connected by bolt 227 to an element 233 located within the bar 210 and carrying the secondary catches 219 which co-operate with the secondary step 209 on the external surface of an internal sleeve 234. The sleeve 234 is secured to the cylinder 201 and is arranged coaxially within the bar 210 to surround the backing bar 215. The bolt 227 extends radially through the longitudinal slot 228 formed in the bar 210 and through a longitudinal slot 235 formed in the secondary locking piston 220. The piston 220 is slidable in a sealed manner within the element 238 which is in contact with the bar 210 through section 236, and with the internal sleeve 234 through the section 237. The piston 220 is thrust towards the secondary catches 219 by the second spring 226 which also bears on the element 238, and is arranged to engage the stop 229 of the backing bar 215.

Figure 4:
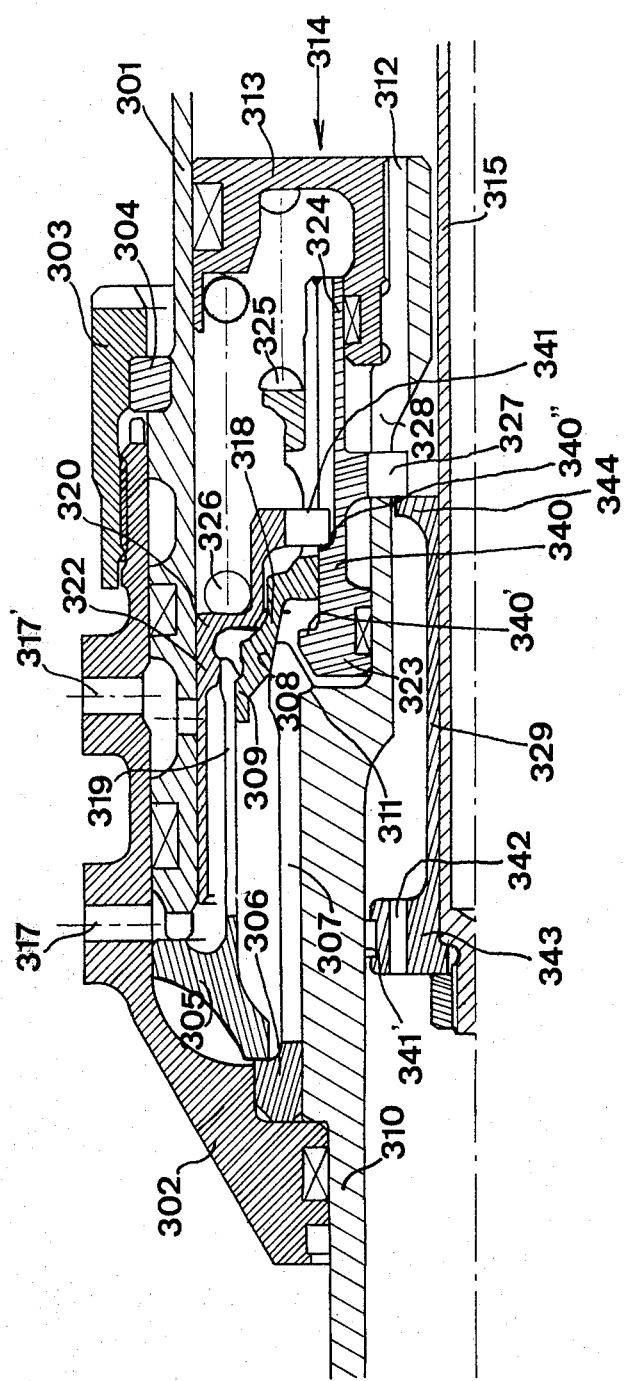

Referring now to FIG. 4, the jack comprises a cylinder 301 having an end entered into a cylinder base 302 through which the bar 310 of the jack extends axially. The assembly formed by the clinder 301 and the base 302 is secured by a closure element 303, a wedged ring 304, wedged ring 305 which bears against the extremity of the cylinder 301 and ring 306 which is sandwiched between 305 and an adjacent inner end part of the base 302.

The wedged ring 306 comprises the base member of a set of principal resilient catches 307 which extend axially within the cylinder 301. The free extremities of the catches form a sloping face 308 of frustoconical shape.

The catches 307 are so arranged as to engage a principal step 311 on the bar 310, when the jack is in the "bar extended" position.

A piston element 313 is secured to the end of the jack bar 310 and is slidable in a sealed manner within the cylinder 301. The bar 310 is itself slidably mounted on a central co-axial backing bar 315 which is actuated mechanically, for example by means of a rack or lever. Thus, the piston element 313 and the bar end 312 form the operating piston 314 of the bar 310, which renders it possible to displace the bar 310 into the "bar retracted" position and into the "bar extended" position by application of hydraulic pressure to, respectively, the front chamber (behind 302) as will be described below, and to the rear chamber of the jack delimited by the piston 313, the rear portion of the cylinder 301 which is not illustrated, and the base of the bar 310.

The backing bar 315 is installed within the bar 310 without seals, by means of guide pads 341' which are carried by an element 329 secured to the backing bar 315. The extremity 343 has communication passageways 342, the other extremity 344 acting as a stop for a tongue 327 as will be described below.

The catches 307 form a sloping face 308 which cooperates with a sloping bearing surface of corresponding shape on a principal locking piston 318. The piston is urged in the locking direction by a compression spring 325 bearing on the piston element 313.

This principal locking piston 318 is formed with a secondary step 309 at the rear of the sloping bearing surface, and a set of secondary resilient catches 319 integral with the wedge 305 engage behind the step 309 in the "bar extended" position of the jack. The secondary resilient catches 319 are locked in the "bar extended" position of the jack, by means of the head 322 of a secondary locking piston 320 which is resiliently urged towards the catches under the action of a compression spring 326 bearing on the piston element 313.

The principal locking piston 318 which is urged towards the principal catches 307, is slidably mounted on a hydraulic release piston 340.

The secondary locking piston 320, which partially surrounds the principal locking piston 318, is slidably mounted within the cylinder 301.

The hydraulic release piston provides two stops, 340' and 340", for holding the said pistons 318 and 320, respectively, in the unlocked position. In this respect, it is to be noted that the principal locking piston 318 comprises, in its portion sliding on the hydraulic release piston 340, longitudinal cut-outs through which pass tongues 341 formed integrally with the secondary locking piston 320, thanks to which this latter may be entrained by the stop 340" of the hydraulic release piston 340.

The hydraulic release piston 340 is slidably mounted, by means of sealing bearing surfaces, at its front portion on the bar 310 and at its rear portion within an internal bore of the piston element 313. The hydraulic-release piston 340 comprises at least two tongues 327 passing through a longitudinal cut-out 328 in the bar end 312 within the cylinder 301. The tongues 327 come into engagement at the ends of their travel, in the "bar extended" position of the jack, with the ends of the cut-outs 328 and also engage a stop 344 formed on the backing bar 315.

The hydraulic release piston 340 comprises two front portions of different internal diameter, these being a small-diameter section 323 extending towards the principal catches 307, and a larger-diameter section 324 extending towards the piston element 313.

Consequently, the front chamber of the jack is defined by the assembly of the cylinder 301 and the cylinder base 302 (which is stationary), by the bar 310 of the jack and the piston element 313 (axially displaceable with respect to said assembly), and by the hydraulic release piston 340 which is itself displaceable with respect to the bar 310 and the piston element 313. This front chamber is supplied with hydraulic fluid through a first feed orifice 317 on the one hand, and, on the other hand, through a second feed orifice 317' which is shut off in the "bar extended" position by an extension of the head 322 of the secondary piston which acts as a valve member.

The operation of the jack which has been described is as follows.

At the locking instant, the principal catches 307 engage on the principal step 311 and stop the advance of the principal locking piston 318, which compresses the spring 325.

The secondary catches 319 engage the secondary step 309 and stop the advance of the secondary locking piston 320, which compresses the spring 326.

Because the principal locking piston 318 and the secondary locking piston 320 are slidable on the hydraulic release piston 340, the piston 340 may be displaced to the left (in the drawings) by counter-thrusts without entraining either the principal locking piston 318 or the secondary locking piston 320, and thus without overloading the catches, particularly the secondary resilient catches 319.

The locking action is smoother because the locking action is thus screened from the effect of possible counterthrusts. At the end of the above travel, the orifice 317' is shut off by the extension of the locking head 322, and the hydraulic fluid is expelled from the cylinder at a lesser rate of flow, which results in a hydraulic braking action at the end of the extension stroke of the bar 310.

As soon as the catches 307 are positioned behind the principal step 311, the spring 325 pushes the principal locking piston 318 into the locked position by the catches 307.

The catches 319 are then positioned behind the step 309 on the principal locking piston 318, and the spring 326 pushes the secondary locking piston 320 into the locked position realised by the secondary catches 319.

The locking of the jack has then been accomplished.

To perform hydraulic release, the hydraulic fluid is allowed to enter the front chamber via the feed orifice 317' only, the feed orifice 317'' being closed.

By differential piston effect between the sections 323 and 324 of the hydraulic release piston, the piston 340 is driven towards the right whilst entraining, against the opposing action of the spring 326, the secondary locking piston 320 through tongue 341 and the end-of travel stop 340''. This action results in freeing the secondary catches 319. The release of the principal catches is thus obtained:

either by means of the stop 340' acting against the opposing action of the spring 325 on the principal locking piston 318, in the case in which the load acting on the jack is absent or small;

or under the action of this load acting in the "bar retracting" direction, by virtue of the furstoconical shape of the surface 308. The freed jack bar 310 may thus return into the cylinder 301 to occupy the "bar retracted" position. As soon as the feed orifice 317' is uncovered by the extension of the secondary locking piston, the rate of flow of hydraulic fluid is increased and the withdrawal displacement of the bar 310 is accelerated.

Mechanical release of the jack is obtained by pulling the backing bar 315 to the right (in the drawings), for example by means of a rack and pinion system. The stop 344 on the backing bar 315 then engages the tongue 327 of the hydraulic release piston, and the freeing sequence proceeds as previously described.

A substantial advantage of the jack described with reference to FIG. 4 derives from its structure which is characterised by the assembly in two parallel stages of the catches 307 and 319, of the locking pistons 318 and 320, and of the springs 325 and 326.

The springs 325 and 326 bear on the piston element 313 at their one ends, and on the pistons 307 and 319, respectively, at their other ends. They consequently operate independently of each other, so that, if one of the springs breaks, this does not cause release of the catches related to the other spring.

The invention is not limited to jacks equipped with devices for locking in the "bar extended" position, but extends to other mechanisms which incorporate a device for locking in the "bar retracted" position, or in the two positions of the bar, such as applied in operating landing gear and their related parts.

We claim:

1. A jack, comprising
a cylinder;
a jack bar slidable in said cylinder from a bar extended position to a bar retracted position, said bar including a principal step;
a principal longitudinal catch associated with said jack bar and adapted to engage said principal step in the bar extended position, said catch having a free extremity forming a sloping face;
principal piston locking means cooperating with, said jack bar, said principal piston locking means including a bearing surface complementary to said sloping face and cooperating therewith to urge said principal catch into engagement with said principal step;
cooperating locking and releasing means between said cylinder and said principal locking piston means for urging said principal longitudinal catch into engagement with said principal step for holding said jack bar in the bar extended position and for permitting said principal longitudinal catch to become disengaged from said principal step and urging said jack bar to slide to its bar retracted position;
said locking and releasing means comprises:
an auxiliary step forming part of said principal piston locking means;
auxiliary piston locking means associated with said principal piston locking means and contained within said cylinder;
an auxiliary resilient longitudinal catch connected with said cylinder and operatively associated with said auxiliary piston locking means; and,
locking head means secured to said auxiliary piston means cooperating with said auxiliary resilient longitudinal catch for holding thereof in engagement with said auxiliary step in the bar extended position.

2. The jack as claimed in claim 1, wherein said locking and releasing means comprises:
an auxiliary step fastened to said jack bar,
an auxiliary resilient longitudinal catch secured to said principal piston locking means cooperating with and engageable with said auxiliary step in the bar extended position;
auxiliary piston locking means coupled with said principal piston means and cooperating with said cylinder; and,
locking head means secured to said auxiliary piston means cooperating with said auxiliary catch for maintenance thereof in engagement with said auxiliary step in the bar extended postion.

3. The jack as claimed in claim 2 or 1, including hydraulic actuator means and mechanical actuator means cooperating with said locking and releasing means for causing said jack bar to slide from its bar extended position to its bar retracted position; and,
said mechanical actuator means including a mechanically displaceable backing bar in said cylinder operatively associated with said principal piston locking means for disengagement of said principal longitudinal catch from said principal step in response to an operating movement of said backing bar into said cylinder and said hydraulic actuator means including means associated with said principal piston locking means for disengagement thereof from said principal step in response to an operating thrust of said jack bar into said cylinder by causing said auxiliary piston means to move to displace said locking head means whereby to permit said auxiliary catch to become disengaged from said auxiliary step, thereby releasing said principal longitudinal catch from engagement with said principal step.

4. A jack according to claim 2, wherein
said auxiliary and said principal catches extend from the base of said cylinder, and
said auxiliary step is carried by said principal piston locking means and said principal and said auxiliary catches are parallel to each other and operable in the same direction.

5. A jack according to claim 4, including
an actuating piston secured to the end of said jack bar within said cylinder, and
first and second springs which bear on said actuating piston for urging said principal piston means and said auxiliary piston means towards said principal and said auxiliary catches.

6. A jack according to claim 5, in which said principal catch, said principal piston locking means and said first spring, respectively, are surrounded by said auxiliary catch, said auxiliary piston locking means and said second spring.

7. The jack as claimed in claim 1, wherein
said principal piston locking means includes a set of principal resilient catches for bearing the major proportion of the locking stresses; and
a mechanically displaceable backing bar in said cylinder operatively associated with said set of principal piston locking means for disengagement of each said principal catch from its said associated principal step in response to an operating thrust of said jack bar into said cylinder and operable to cause said locking head means to enable said auxiliary catch to become disengaged from said auxiliary step;
said auxiliary piston locking means cooperating with said principal locking piston means for locking thereof responsive to a short operating stroke and responsive to be released either hydraulically under the action of an operating thrust from said jack bar or mechanically by means of said mechanically displaceable backing bar, the freeing of said auxiliary locking means involving a short operating stroke which results in the release of said principal locking means, this release being assisted by the effect of the load of said jack bar on the sloping face of said principal catches.

8. The jack as claimed in claim 1, including
first spring means operatively associated with said auxiliary piston means for spring-urging said locking head means towards said auxiliary catch for holding thereof in engagement with said auxiliary step,
second spring means operatively associated with said principal piston locking means for spring-urging said principal catch into engagement with said principal step,
a mechanically displaceable backing bar in said cylinder operatively associated with said principal piston locking means for disengagement of said principal catch from said principal step in response to an operating thrust of said jack bar into said cylinder by causing said auxiliary piston means to move to displace said locking head means to permit said auxiliary catch to become disengaged from said auxiliary step;
an hydraulic release piston sealingly slidably mounted on said jack bar and operatively associated with said first and said second spring means for urging said catches into engagement with their said respective steps, said release piston and said backing bar including cooperating steps to permit displacement of said release piston hydraulically in response to an operating thrust on said jack bar and mechanically in response to entrainment of said backing bar for movement of said principal and said auxiliary piston means into the position of release of said catches from said steps.

9. A jack according to claim 8, wherein
said hydraulic release piston includes two sections of different internal diameter and is slidable on said jack bar by means of said two sections of different internal diameter in sealing contact with sections carried by said jack bar;
said backing bar including a stop;
said jack bar having a longitudinal opening; and
said hydraulic release piston having at least one tongue extending radially through said longitudinal opening to lie in the path of said stop.

10. A jack according to claim 9,
said hydraulic release piston having a slot and carrying a stop;
said principal piston locking means having a longitudinal opening; and,
said auxiliary piston locking means having at least one tongue extending radially through said longitudinal opening in said principal piston locking means and entering said slot formed in said hydraulic release piston for engagement with said stop carried by said hydraulic release piston.

11. A jack according to claim 10, in which the displacements of said hydraulic release pistons are limited in one direction by said actuating piston and in the other direction by said principal step on said jack bar.

12. A jack according to claim 10,
said cylinder having two openings for releasing and operating hydraulic fluid, and
one of said openings being arranged to be shut off by said auxiliary piston locking means for obtaining an hydraulic braking action at the end of travel in a locking action and at the beginning of travel in a release action.

* * * * *